United States Patent
Harris

(10) Patent No.: US 8,090,162 B2
(45) Date of Patent: Jan. 3, 2012

(54) USING BIOMETRICS AS AN ENCRYPTION KEY

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

(21) Appl. No.: 12/609,418

(22) Filed: Oct. 30, 2009

(65) Prior Publication Data

US 2010/0046811 A1    Feb. 25, 2010

Related U.S. Application Data

(63) Continuation of application No. 09/577,449, filed on May 24, 2000.

(51) Int. Cl.
*G06K 9/00* (2006.01)

(52) U.S. Cl. ........ 382/124; 713/186; 382/115; 382/125; 348/302

(58) Field of Classification Search .................. 713/186; 382/124, 125, 115; 348/302
See application file for complete search history.

(56) References Cited

U.S. PATENT DOCUMENTS

| | | | | |
|---|---|---|---|---|
| 5,712,912 A | 1/1998 | Tomko et al. | | 713/186 |
| 5,790,668 A | 8/1998 | Tomko | | 713/186 |
| 5,933,190 A * | 8/1999 | Dierickx et al. | | 348/302 |
| 5,933,515 A | 8/1999 | Pu et al. | | |
| 5,978,495 A | 11/1999 | Thomopoulos et al. | | |
| 6,002,787 A * | 12/1999 | Takhar et al. | | 382/125 |
| 6,035,398 A * | 3/2000 | Bjorn | | 713/186 |
| 6,052,458 A | 4/2000 | Amir-Ebrahimi | | |
| 6,122,737 A | 9/2000 | Bjom et al. | | 713/186 |
| 6,202,151 B1 | 3/2001 | Musgrave et al. | | 713/186 |
| 6,219,794 B1 | 4/2001 | Soutar et al. | | 713/202 |
| 6,241,288 B1 * | 6/2001 | Bergenek et al. | | 283/67 |
| 6,259,805 B1 * | 7/2001 | Freedman et al. | | 382/124 |
| 6,311,272 B1 | 10/2001 | Gressel | | 713/186 |
| 6,317,834 B1 | 11/2001 | Gennaro et al. | | 713/186 |
| 6,487,662 B1 | 11/2002 | Kharon et al. | | 713/186 |
| 6,507,662 B1 | 1/2003 | Brooks | | 382/115 |
| 6,628,810 B1 | 9/2003 | Harkin | | 382/116 |
| 6,714,665 B1 * | 3/2004 | Hanna et al. | | 382/117 |

OTHER PUBLICATIONS

A 600-dpi Capacity Fingerprint Sensor Chip and Image-Synthesis Technique IEEE Journal of Solid-State Circuits, U vol. 34. No. 4, Apr. 1999 Jeong-Woo Lee, Dong-Jin Min. Jiyoun Kim, and Wonchan Kim, Members, IEEE.

* cited by examiner

*Primary Examiner* — Kyung H Shin
(74) *Attorney, Agent, or Firm* — Law Office of Scott C. Harris, Inc.

(57) ABSTRACT

An image of an biometric part is used as encryption or decryption key. The biometric part image is obtained, and items within the biometric part are analyzed. Relationships between those parts are determined, (e.g. ratios) between different parameters of different parts. Those ratios are then used to form the key. A sequence of biometric information can be used in which case both the information itself and the sequence are used to form to the key.

20 Claims, 2 Drawing Sheets

USING BIOMETRICS AS AN ENCRYPTION KEY

BACKGROUND

Biometrics allows a person to use a unique part of their body for identification purposes.

Many different body part templates have been suggested for biometrics, including fingerprints, face prints, retinal scans and DNA sequences.

Many different ways of obtaining and using biometric information are well known in the art. The body part is compared with a prestored template. A match between the part and the template allows some action to be taken. Effectively these previous biometric systems used the biometric information as a key that opens a lock. The biometric information is compared with a template. The lock opens based on the comparison.

Continuing the analogy, once the key has unlocked the lock, the user has access to information.

Encryption has also been used for security, but in a different way. Encryption is used to change the information itself. No lock and key is necessary—the information can be disseminated, and the decryption key can be used to retrieve it.

Encryption is often used for messages, e.g. by email. Encryption is also used to keep private certain information in an account, for example.

One popular kind of encryption is public key cryptography. The encryption key is public and anyone can use it. Only the person having the private key can decrypt a message, however. If user A encrypts a message with user B's public key, only B can decrypt the message. No one else, not even user A, can decrypt the message. Other similar cryptosystems are known. All have in common that there must be a decryption key -£typically a large number.

SUMMARY

It can be difficult to store the key for an encryption system. For instance, in a public key cryptography system, the user typically stores their private key inside their computer. However, a person with access to the user's computer can obtain access to the private key with much less security than is provided by the key itself. The private key is too long to memorize (e.g. 128 bits), and instead must be transported for example on a transportable storage medium. This is by itself inconvenient.

The present application teaches a way of using biometrics to form an encryption and/or decryption key. The biometric information itself is translated into an encryption and/or decryption key. Therefore, the key is always available to the user, since it is formed based on the user's body parts.

The key is formed by comparing the relationship of parts of the biometric information.

An aspect of the invention uses a sequence of biometric information as the key. Only the specified sequence forms a proper key. Therefore, surreptitiously obtaining the user's biometric information will not enable forming a proper key without also knowing the proper combination.

Another aspect uses relative information from the biometric information to form the key. In this way, the key is formed independent of the absolute dimensions of the biometric information. The key that is formed can use the obtained information as a "seed", or can use the information directly.

Yet another aspect uses the concept of relative dimensions with biometrics as they have been conventionally been conceived, to determine if the biometric information fits a proper profile, and use that recognition to allow access.

BRIEF DESCRIPTION OF THE DRAWINGS

These and other aspects of the invention will be described in detail with reference to the accompanying drawings, wherein.

DESCRIPTION OF THE EMBODIMENTS

Figure 1:
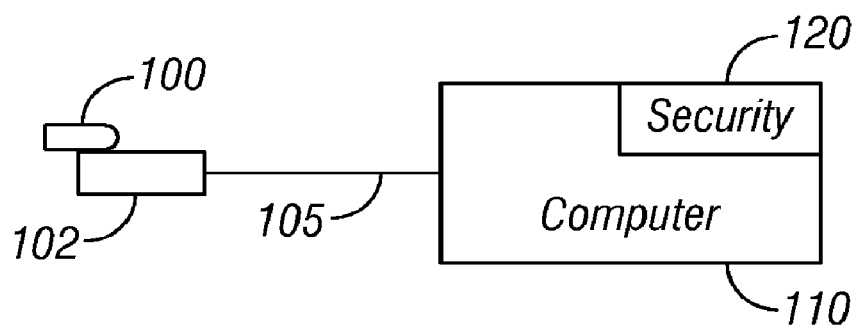
FIG. 1 shows an embodiment.

An embodiment is shown in FIG. 1. A personal computer system 99 includes a biometric reading device 102. The personal computer 99 itself runs an application software layer 110 (e.g. an operating system) that includes security software 120. The security software relies on a cryptographic key for its proper operation.

In a particularly preferred embodiment, the security software 120 is a public key encryption/decryption system. The private key is based on the user's biometric information.

FIG. 1 shows the user placing a body part 100 into a biometric reading device 102. The information from the user's body part 100 is transmitted along line 105 to software layer 110, running the application program 120, for example, a security program.

Figure 2:
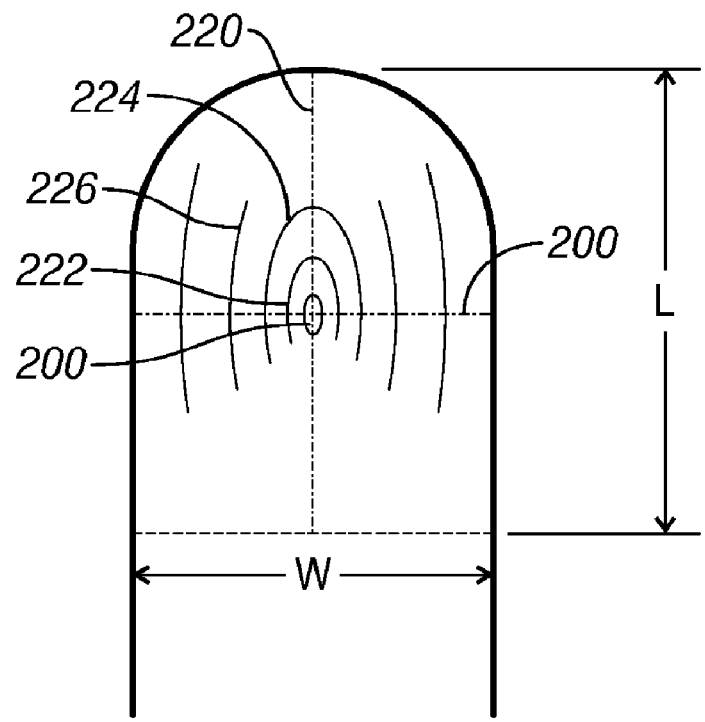
FIG. 2 shows a layout of an exemplary fingerprint.

The biometric device 102 can be any conventional fingerprint reader, which reads and produces an analog image or digital sample of the fingerprint. Either case produces what is effectively an image of the user's fingerprint. The image is conceptually shown in FIG. 2. All fingerprints have certain general characteristics. The fingerprints have a number of ridges 222, 224, 226, which come together at a substantially center point 200. The center point of the user's fingerprint is taken as a center line. A number of ridges are formed around that center point. The lines on each user's fingerprint are different. A typical fingerprint may have approximately 25 to 35 lines in the width wise direction, and approximately 30 to 60 lines in the length wise direction. In this embodiment, the center point 200 is used as a point to draw reference lines. The reference line 210 defines a widthwise direction and the line 220 defines a lengthwise direction.

Figure 3:
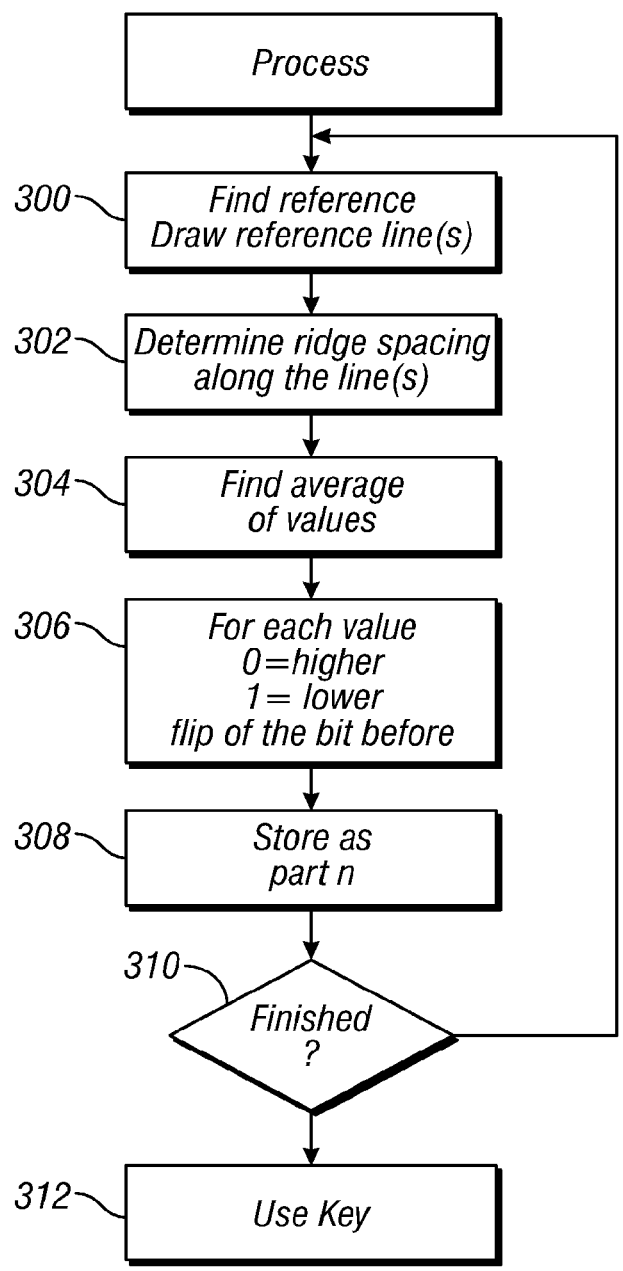
FIG. 3 shows a flowchart of operation.

Since a typical fingerprint scanner provides an image of the entire fingerprint, all of this processing can be done in the computer 99. This is carried out according to the flowchart of FIG. 3 which may run on computer 110.

At 300, the system finds a reference point and defines reference lines. The reference lines can include one line such as 210 in FIG. 2, or alternatively can be more than one reference line. A second reference line, for example could be reference line 220 in FIG. 2. Since the whole image of the fingerprint is available these lines can easily be made parallel or perpendicular to an "axis".

At 302, the system determines ridge spacing along the reference line. For example, in FIG. 2, a first ridge 222 closest to the determined center is taken as the first found ridge. This is the ridge closest to the reference point, and avoids determination of the edge of the fingerprint, or determining what is the first ridge. The ridge 222 in this embodiment is defined as the ridge, on the left, closest to the center. The second ridge 224 is the next ridge over to the left. The ridge 226 after that is the next ridge to the left. For purposes of illustration, the system determines the spacing between 10 ridges on the left and 10 ridges on the right. This produces 20 values.

At 304, the system finds the average of all the values.

Then at 306 the current value is compared to the average. "0" is defined if the current value is higher than the average, or a "1" if the current value is lower than the average. If the spacing is equal to the average, then the value is taken as the inverse of the bit before it.

Figure 4:
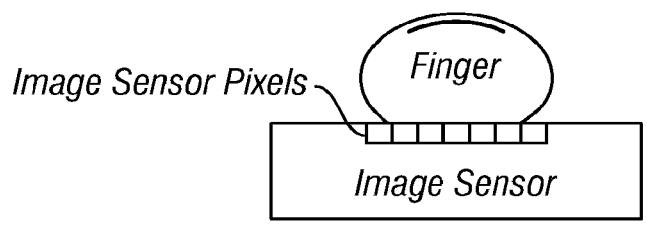
FIG. 4 shows a special kind of fingerprint reader, and an example of its operation.

A simple example is shown in FIG. 4. The sensor 100 detects distances, here shown as 5, 4, 6, 8, 9 and 4. The total of these is 36, and since third are six distances, the average is 6. Now each of the values is compared with the average, to obtain 00X110, since the last bit represents a tie. This flips the x bit before it to obtain 001110. At 308, the value thus obtained is stored as part n of the key. 310 detects if the key is complete. If so, the key is used at 312. If not, flow returns to 300 to obtain another part of the key. This can use another specified reference line, e.g., a perpendicular line such as shown as line 220. It could alternately and more preferably be biometric information from a different biometric part, e.g. a different finger.

The lines that are used to obtain the information can also be at specified angles to the reference lines, e.g., at 22 degrees. The angles can be set, or can be entered by the user, as a form of personal identification. For example, the user can enter 22 while a specified finger is in the reader. This takes the line along 22 degrees. It effectively forms a PIN that must be entered to obtain the proper code from the biometric information.

By piecing together the decryption key from different body parts, the present system also provides an additional layer of security. The system above has described getting about 20 digits from a single biometric scan. This may correspond to 20 bits. If two orthogonal dimensions are defined as shown in the picture, this doubles the amount of information to 40 bits. However, by combining three fingerprints, a much more robust key length of 120 bits can be obtained. Moreover, additional security is provided by the specific selection of fingerprints. Only the user knows which biometric items to input, how many, and in which order. This effectively forms a barrier against others using this information.

An advantage of the present system comes from the use of relative, rather than absolute, information. No calibration is necessary, since each of the values is calculated based on comparing parts of the fingerprint to itself, not to some absolute reference. The digits are unambiguous, since there is no calibration, only an internal sensing of relationships among the different parts. The only necessary commonality is resolution—the image sensor used must have sufficient resolution to sense each ridge of the fingerprint.

FIG. 4 shows an embodiment in which the fingerprint sensor is actually an image sensor chip, e.g., a CCD image sensor or active pixel sensor type device or infra-red photodetect. The chip's active surface is usually placed to receive the image of a larger area. However, in this embodiment, the pixels of the sensor are directly mapped to the user's finger. The finger is placed directly on the sensor. The position and orientation of the user's finger does not matter, since an unambiguous reference is obtained from the comparison of the different parts of the biometric information.

Another embodiment uses the relative relationship of the biometric information as described above in the conventional way that biometric information has been used. The relative relationship among the biometric information is used to form a number. That number is compared against a prestored number to determine identity. The test yields a pass if the information agrees.

Other biometric information can be used in a similar way. Retinal scans can be used by determining the same kind of relationship among lines of the scan, for example.

Other embodiments are within the disclosed invention.

What is claimed is:

1. A method of analyzing a biometric part, comprising:
receiving information indicative of a scan of a biometric part of an individual;
using a computer for analyzing said information to determine certain features of the biometric within said information, and for determining a reference within said scan of said biometric part, where said determining comprises determining the reference from said information of said biometric part, and for comparing said features with said reference; and
determining a value from said comparing said features with said reference, and using said value as indicative of the biometric.

2. A method as in claim 1, wherein said biometric is a fingerprint.

3. A method as in claim 2, wherein said reference is an average of certain features within the fingerprint.

4. A method as in claim 3, wherein said comparing comprises determining a reference, finding features relative to the reference, and for each of said features, determining if a value of the feature has a value greater than said reference or lower than said reference.

5. A method as in claim 4, further comprising making a score based on whether said value is greater than said reference or less than said reference.

6. A method as in claim 5, wherein said reference is a line.

7. A method as in claim 6, wherein said user sets an angle of the reference line.

8. A method as in claim 5, wherein said score is a number that is used to determine identity.

9. A biometric analyzing device, comprising:
a scan part that receives information indicative of a scan of a biometric part of an individual; and
a computer that analyzes said information to determine certain features of the biometric within said information, and compares said features with a reference that is itself determined from the biometric within said information, and determining a value from said comparing said features with said reference, and using said value as an output indicative of the biometric.

10. A device as in claim 9, wherein said biometric is a fingerprint, and said scan part includes a fingerprint scanner.

11. A device as in claim 10, wherein said computer determines an average of certain features within the fingerprint and said reference is based on said average.

12. A device as in claim 11, wherein said computer compares features relative to the reference, and for each of said features, determining if a value of the feature has a value greater than said reference or lower than said reference.

13. A device as in claim 12, wherein said computer makes a score based on whether said value is greater than said reference or less than said reference.

14. A device as in claim 13, wherein said computer determines a line as said reference.

15. A device as in claim 14, wherein said computer accepts input about an angle of the reference line.

16. A device as in claim 13, wherein said score is used by said computer to determine identity.

17. A device as in claim 10, wherein said scan part is an image sensor integrated circuit having an active surface which receives radiation, and where pixels of the active surface directly receive the fingerprint for scanning and where said pixels of said active surface are mapped directly in size to the fingerprint that is received, such that the size of one pixel on the sensor is the same size as the part of the fingerprint that said one pixel images.

18. A biometric analyzing device, comprising:
  a scanning part that receives information indicative of a fingerprint scan of a biometric part of an individual, said scanning part including an image sensor integrated circuit having an active surface which receives radiation, and where pixels of the active surface directly receive the fingerprint for scanning and where said pixels of said active surface are mapped directly in size to the fingerprint that is received, such that the size of one pixel on the sensor is the same size as the part of the fingerprint that said one pixel images ; and
  a computer that analyzes said information in a way that is independent of position and orientation.

19. A device as in claim 18, wherein said computer analyzes in a way that is also independent of absolute size, and compares said features with a reference that is itself determined from the biometric within said information, and determines a value from said comparing said features with said reference, and using said value as an output indicative of the biometric.

20. A device as in claim 19, wherein said computer determines an average of certain features within the fingerprint and said reference is based on said average.

\* \* \* \* \*